(12) United States Patent
Chen et al.

(10) Patent No.: US 9,330,870 B2
(45) Date of Patent: May 3, 2016

(54) AC LINE POWERED RELAY DRIVING CIRCUITS

(71) Applicant: Emerson Electric Co., St. Louis, MO (US)

(72) Inventors: Cuiyun Chen, Jiangsu (CN); Xingeng Zhou, Jiangsu (CN)

(73) Assignee: Emerson Electric Co., St. Louis, MO (US)

( * ) Notice: Subject to any disclaimer, the term of this patent is extended or adjusted under 35 U.S.C. 154(b) by 101 days.

(21) Appl. No.: 14/146,878

(22) Filed: Jan. 3, 2014

(65) Prior Publication Data

US 2015/0055271 A1  Feb. 26, 2015

(30) Foreign Application Priority Data

Aug. 23, 2013  (CN) ...................... 2013 2 0519814 U

(51) Int. Cl.
*H01H 47/00*  (2006.01)
*H01H 47/32*  (2006.01)
*H01H 47/22*  (2006.01)
H02H 3/00  (2006.01)
H02H 7/00  (2006.01)
H02H 9/08  (2006.01)
H01H 9/00  (2006.01)
H01H 51/22  (2006.01)
*H01H 47/02*  (2006.01)

(52) U.S. Cl.
CPC ............. *H01H 47/325* (2013.01); *H01H 47/22* (2013.01); *H01H 47/02* (2013.01)

(58) Field of Classification Search
CPC ...... H01H 47/325; H01H 47/22; H01H 47/36
USPC ................................ 361/2, 42, 189, 160, 166
See application file for complete search history.

(56) References Cited

U.S. PATENT DOCUMENTS

| | | | |
|---|---|---|---|
| 3,422,279 A * | 1/1969 | Rowell ..................... | 307/132 M |
| 3,808,512 A | 4/1974 | Sakka | |
| 3,847,533 A * | 11/1974 | Riordan .......................... | 431/78 |
| 5,270,913 A | 12/1993 | Limpaecher | |
| 6,232,752 B1 | 5/2001 | Bissell | |
| 6,777,649 B2 | 8/2004 | Reynolds et al. | |
| 2005/0259373 A1 * | 11/2005 | Hoopes ........................ | 361/90 |
| 2012/0257429 A1 | 10/2012 | Dong et al. | |

* cited by examiner

*Primary Examiner* — Thienvu Tran
*Assistant Examiner* — Lucy Thomas
(74) *Attorney, Agent, or Firm* — Harness, Dickey & Pierce, P.L.C.

(57) ABSTRACT

Disclosed are exemplary embodiments of relay drive circuits. In an exemplary embodiment, a relay drive circuit generally includes a first diode, a second diode, a third diode, a first transistor, a second transistor, a first capacitor, and a second capacitor. The relay drive circuit is operable to transform an AC voltage to a DC voltage, and then use the DC voltage to control on/off of the relay.

12 Claims, 1 Drawing Sheet

US 9,330,870 B2

AC LINE POWERED RELAY DRIVING CIRCUITS

CROSS-REFERENCE TO RELATED APPLICATION

This application claims the benefit and priority of Chinese Utility Model Patent Application No. 201320519814.7 filed Aug. 23, 2013. The entire disclosure of the above application is incorporated herein by reference.

FIELD

The present disclosure relates to AC line powered relay drive circuits.

BACKGROUND

This section provides background information related to the present disclosure which is not necessarily prior art.

At present, relays are widely used in appliance control technology. The rated voltage for driving a relay is normally lower DC voltage, e.g., 5 VDC, 12 VDC, or 24 VDC, etc. DC voltage is provided to the relay to make sure the relay is in normal operation. But in a system powered by an AC power supply, an additional DC power supply is needed for driving coils of the relay with the DC voltage. The additional DC power supply increases costs.

Presently, a switching mode power supply (SMPS) is used to step down the AC line voltage to a lower DC voltage, or a linear transformer is used to step down the AC line voltage to a lower AC voltage. Then, a DC voltage for the relay is produced by the regulating diodes and capacitors. But the switching mode power supply or the linear transformer also increases costs.

SUMMARY

This section provides a general summary of the disclosure, and is not a comprehensive disclosure of its full scope or all of its features.

Disclosed are exemplary embodiments of relay drive circuits. In an exemplary embodiment, a relay drive circuit generally includes a first diode, a second diode, a third diode, a first transistor, a second transistor, a first capacitor, and a second capacitor. The relay drive circuit is operable to transform an AC voltage to a DC voltage, and then use the DC voltage to control on/off of the relay.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
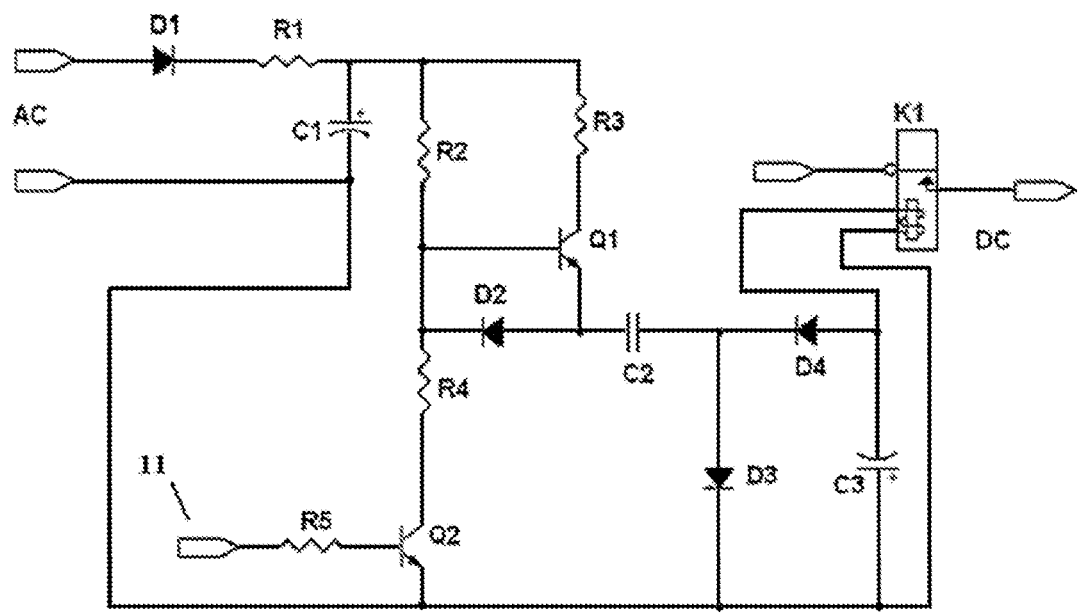
FIG. 1 illustrates a relay drive circuit according to a first exemplary embodiment.

Example embodiments will now be described more fully with reference to the accompanying drawings.

Disclosed are exemplary embodiments of relay drive circuits. In an exemplary embodiment, a relay drive circuit generally includes a first diode, a second diode, a third diode, a first transistor, a second transistor, a first capacitor, and a second capacitor. The relay drive circuit is operable to transform an AC voltage to a DC voltage, and then use the DC voltage to control on/off of the relay. The relay drive circuit may be used to drive the relay without using other additional components in an AC power supply system. The relay drive circuit may have a lower cost and simpler structure compared with existing circuits. Because an additional power supply is not required for the relay, the relay drive circuit may efficiently save costs and resources. For example, some exemplary embodiments may save the cost of the power supply circuit as no additional power supply for the relay is needed or included. In exemplary embodiments, the power consumption on a relay coil can be controlled in a proper range by making changes to the duty cycle and frequency to adjust the voltage on a relay coil. In exemplary embodiments, the circuit has a highly reliable design, in which a component failure does not turn on the relay accidently.

In exemplary embodiments, the relay drive circuit comprises a rectifying circuit and a DC voltage converting circuit. The rectifying circuit is electrically connected with an AC power supply to rectify the high AC voltage into high DC voltage. The DC voltage converting circuit is electrically connected between the rectifying circuit and a relay K1. The DC voltage converting circuit is used to transform the high DC voltage into low DC voltage and to drive the relay K1.

According to a first aspect of the present disclosure, there is provided a relay drive circuit. In exemplary embodiments, the relay drive circuit includes a first diode, a second diode and a third diode. The relay drive circuit also includes a first transistor, a second transistor, a first capacitor and a second capacitor. The first capacitor includes a positive pole and a negative pole. The positive pole of the first diode is electrically connected to a positive terminal of an AC supply. The negative pole of the first diode is electrically connected to the positive pole of the first capacitor. The negative pole of the first capacitor is electrically connected to a negative terminal of the AC supply. The base of the first transistor is connected to the negative pole of the second diode and to the positive pole of the first capacitor. The second diode is connected between the base of the first transistor and the emitter of the first transistor. The second capacitor is connected between the emitter of the first transistor and the relay. The collector of the first transistor is connected to the negative pole of the first diode and the positive pole of the first capacitor. The base of the second transistor is connected with a drive signal to control the second transistor. The collector of the second transistor is connected to the negative pole of the second diode. The emitter of the second transistor is connected to the negative pole of the first capacitor. The positive pole of the third diode and the second capacitor are connected to the relay. The negative pole of the third diode is connected to the negative pole of the first capacitor and the emitter of the second transistor. The relay is connected to the negative pole of the third diode. The emitter of the second transistor and the negative pole of the first capacitor.

In exemplary embodiments, the relay drive circuit may further comprise a fourth diode and a third capacitor. The positive pole of the third capacitor is connected to the negative pole of the third diode, the emitter of the second transistor, and the negative pole of the first capacitor. The negative pole of the third capacitor and the positive pole of the fourth diode are connected to the relay. The negative pole of the fourth diode is connected to the positive pole of the third diode and the second capacitor.

In exemplary embodiments, the relay drive circuit may further include a first resistor connected in series with the first diode. The relay drive circuit may further comprise a second resistor, a third resistor, a fourth resistor, and a fifth resistor. The second resistor is connected between the positive pole of the first capacitor and the base of the first transistor. The third resistor is connected between the positive pole of the first capacitor and the collector of the first transistor. The fourth resistor is connected between the negative pole of the second diode and the collector of the second transistor. The fifth resistor is connected between the base of the second transistor and the drive signal.

According to a second aspect of the present disclosure, there is provided another relay drive circuit. In exemplary embodiments, the relay circuit includes a first diode, a first capacitor including a positive pole and a negative pole, a first transistor, and an integrated circuit to transform high DC current into low DC current including a first terminal, a second terminal and a third terminal. The positive pole of the first diode is electrically connected to a positive terminal of an AC supply. The negative pole of the first diode is electrically connected to the positive pole of the first capacitor. The negative pole of the first capacitor is connected to a negative terminal of the AC supply. The base of the first transistor is connected with a drive signal. The collector of the first transistor is connected with the relay. The emitter of the first transistor is connected to the negative pole of the first capacitor. The first terminal of the integrated circuit is connected to the negative pole of the first diode and the positive pole of the first capacitor. The second terminal of the integrated circuit is connected to the relay. The third terminal of the integrated circuit is connected to the negative pole of the first capacitor.

In exemplary embodiments, The relay drive circuit may further comprise a first resistor and a second resistor. The first resistor is connected between the first diode and the first capacitor. The second resistor is connected between the base of the first transistor and the drive signal.

In exemplary embodiments, a model of the integrated circuit is VIPer12AS. Also, the relay drive circuit may directly take use of the AC power supply to drive the relay such that an additional power supply for the relay is not required or used.

Exemplary embodiments may be configured to use the AC line voltage directly to provide the power to drive a relay, e.g., a low DC voltage (e.g., 24 VDC, etc.) coil relay, etc. In exemplary embodiments, the voltage on a capacitor may be controlled by the duty cycle and frequency of a drive signal. A relay and the capacitor are in parallel such that the voltage on the capacitor will turn on the relay. Exemplary methods are disclosed of using an AC line voltage to directly provide the power to drive the low DC voltage coil relay. Exemplary embodiments disclosed herein may be used in a wide range of applications, e.g., a thermostat (e.g., a Wi-Fi thermostat, etc.) water heater control, furnace control, unitary control, air handler control, any relay circuit on a control powered by line voltage, etc. In some exemplary embodiments, a circuit is configured for going from AC line voltage to low voltage DC in a single step using one or more transistors, capacitors, diodes, and a pulse-width-modulation (PWM) input.

With reference now to the drawings, FIG. 1 illustrates a first exemplary embodiment of a relay drive circuit embodying one or more aspects of the present disclosure. As shown in FIG. 1, the relay drive circuit comprises a rectifying circuit and a DC voltage converting circuit. The rectifying circuit comprises a first diode D1 and a first capacitor C1. The positive pole of the first diode D1 is electrically connected to a positive terminal of an AC supply. The negative pole of the first diode D1 is electrically connected to the positive pole of the first capacitor C1. The negative pole of the first capacitor C1 is electrically connected to a negative terminal of the AC supply (e.g., 120 VAC supply, etc.).

Also shown in FIG. 1, the voltage across the first capacitor C1 is the output voltage of the rectifying circuit. The high AC input voltage is regulated into a high DC voltage by the rectifying circuit. Then, the high DC voltage is transformed into low DC voltage by the DC voltage converting circuit.

Preferably, the DC voltage converting circuit comprises a second diode D2, a third diode D3, a first transistor Q1, a second transistor Q2, a second capacitor C2, and a drive signal 11. The base of the first transistor Q1 is electrically connected to the output of the rectifying circuit. More specifically, the base of the first transistor Q1 is electrically connected to the negative pole of the first diode D1 and the positive pole of the first capacitor C1. The base of the first transistor Q1 is electrically connected with the negative pole of the second diode D2. The emitter of the first transistor Q1 is electrically connected to the positive pole of the second diode D2 and the second capacitor C2. The collector of the first transistor Q1 is electrically connected to the negative pole of the first diode D1 and the positive pole of the first capacitor C1.

The base of the second transistor Q2 is electrically connected to the drive signal 11 to control a relay K1, e.g., a 24 VDC coil relay, etc. The on/off of the relay K1 can be controlled by the on/off of the second transistor Q2, which is controlled by the drive signal 11. The collector of the second transistor Q2 is electrically connected to the negative pole of the second diode D2. The emitter of the second transistor Q2 is electrically connected to the negative pole of the first capacitor C1.

The positive pole of the third diode D3 and the second capacitor C2 are electrically connected to the relay K1. The negative pole of the third diode D3 is electrically connected to the negative pole of the first capacitor C1 and the emitter of the second transistor Q2. As shown in FIG. 1, the voltage across the third diode D3 is the output voltage of the DC voltage converting circuit. The relay K1 is electrically connected to the negative pole of the third diode D3, the emitter of the second transistor Q2, and the negative pole of the first capacitor C1.

Preferably, the rectifying circuit further comprises a first resistor R1 connected in series between the first diode D1 and the first capacitor C1. The DC voltage converting circuit preferably further comprises a second resistor R2, a third resistor R3, a fourth resistor R4, and a fifth resistor R5. The second resistor R2 is electrically connected between the positive pole of the first capacitor C1 and the base of the first transistor Q1. The third resistor R3 is electrically connected between the positive pole of the first resistor R1 and the collector of the first transistor Q1. The fourth resistor R4 is electrically connected between the negative pole of the second diode D2 and the collector of the second transistor Q2. The fifth resistor R5 is electrically connected between the base of the second transistor Q2 and the drive signal 11.

Furthermore, the relay drive circuit may comprise a filter circuit. The filter circuit is electrically connected between the DC voltage converting circuit and the relay K1, which may make the voltage more stable before it gets through the relay K1.

Furthermore, the filter circuit comprises a fourth diode D4 and a third capacitor C3. The positive pole of the third capacitor C3 is electrically connected to the negative pole of the third diode D3, the emitter of the second transistor Q2, and the negative pole of the first capacitor C1. The negative pole of the third capacitor C3 and the positive pole of the fourth diode D4 are electrically connected to the relay K1. The negative pole of the fourth diode D4 is electrically connected to the positive pole of the third diode D3 and the second capacitor C2. As shown in FIG. 1, the voltage across the third capacitor C3 is the output voltage of the filter circuit.

The principle of the relay drive circuit according to the present disclosure is: a high AC input voltage is regulated into a high DC voltage by the rectifying circuit (the first diode D1, the first resistor R1, and the first capacitor C1). If the drive signal 11 is kept at a low level, the second transistor Q2 is controlled off by the drive signal 11, which is from a microprocessor. At the same time, the first transistor Q1 is on, and the voltage on the first capacitor C1 will charge the second capacitor C2 through the third resistor R3, the first transistor Q1, the second capacitor C2, and the third diode D3. If the drive signal 11 is kept at a high level, the second transistor Q2 is on. At the same time, the first transistor Q1 is off, and the voltage on the second capacitor C2 will charge the third capacitor C3 through the second diode D2, the fourth resistor R4, the second transistor Q2, the third capacitor C3, and the fourth diode D4. Therefore, if the drive signal 11 is a pulse signal (e.g., PWM signal, etc.), the third capacitor C3 will be charged, and the voltage will be kept to a certain level. The voltage on the capacitor C3 may be controlled by the duty cycle and frequency of the drive signal 11. With a suitable frequency and duty cycle of the drive signal 11, the line voltage may be stepped down to a suitable voltage on C3. As the relay K1 is connected in parallel with the third capacitor C3, the voltage across the third capacitor C3 will turn on the relay K1. If the drive signal 11 is kept at a high/low level, there will be no voltage across the third capacitor C3, so the relay K1 is off.

Figure 2:
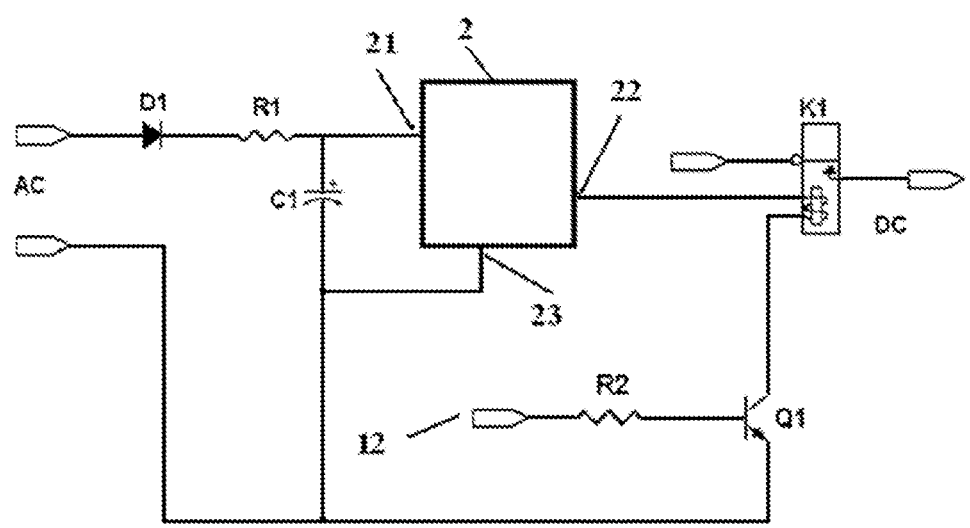
FIG. 2 illustrates a relay drive circuit according to a second exemplary embodiment.

FIG. 2 illustrates a second exemplary embodiment of a relay drive circuit embodying one or more aspects of the present disclosure. As shown in the FIG. 2, this embodiment utilizes an integrated circuit 2 with a specific function. The relay drive circuit comprises a rectifying circuit and an integrated circuit 2 to transform a high DC voltage into a low DC voltage. Preferably, the integrated circuit 2 is integrated with a DC voltage converting circuit. The rectifying circuit is electrically connected with an AC power supply to rectify the high AC voltage into high DC voltage. The DC voltage converting circuit is electrically connected between the rectifying circuit and the relay K1. The DC voltage converting circuit is used to transform the high DC voltage into low DC voltage and is used to drive the relay K1. Then the relay K1 could be supplied with low DC voltage by the rectifying circuit and the integrated circuit 2 in an AC power supply system.

Preferably, the relay drive circuit of the second embodiment comprises a first diode D1, a first capacitor C1, a first transistor Q1, a drive signal 12, and an integrated circuit 2 transforming the high DC voltage into low DC voltage. The positive pole of the first diode D1 is electrically connected to a positive terminal of the AC supply. The negative pole of the first diode D1 is electrically connected to the positive pole of the first capacitor C1. The negative pole of the first capacitor C1 is electrically connected to a negative terminal of the AC supply.

The base of the first transistor Q1 is electrically connected with a drive signal 12. The collector of the first transistor Q1 is electrically connected with the relay K1. The emitter of the first transistor Q1 is electrically connected to the negative pole of the first capacitor C1.

A first terminal (input) 21 of the integrated circuit 2 is electrically connected to the negative pole of the first diode D1 and the positive pole of the first capacitor C1. A second terminal (output) 22 of the integrated circuit 2 is electrically connected to the relay K1. A third terminal 23 of the integrated circuit 2 is electrically connected to the negative pole of the first capacitor C1.

Preferably, an example of the integrated circuit is VIPer12AS. But the integrated circuit is not limited to this specific VIPer12AS type or model, as any other integrated circuit having the same function and/or thought out by people in the art could be included in exemplary embodiments.

Preferably, the relay drive circuit further includes a first resistor R1 and a second resistor R2. The first resistor R1 is electrically connected between the first diode D1 and the first capacitor C1. The second resistor R2 is electrically connected between the base of the first transistor Q1 and the drive signal 12.

Depending on the cooperation of the integrated circuit 2, the rectifying circuit, and the drive signal 12, the relay K1 can be directly controlled by the relay drive circuit in the AC power supply system without using an additional power supply in exemplary embodiments, This, in turn, may efficiently reduce the cost of the relay drive circuit in such embodiments.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A relay drive circuit comprising:
    a first diode having a positive pole and a negative pole;
    a second diode having a positive pole and a negative pole; and
    a third diode having a positive pole and a negative pole;
    a first transistor having a base, an emitter, and a collector;
    a second transistor having a base, an emitter, and a collector;
    a first capacitor having a positive pole and a negative pole; and
    a second capacitor;
    wherein:
        the positive pole of the first diode is electrically connected to a positive terminal of an AC supply;
        the negative pole of the first diode is electrically connected to the positive pole of the first capacitor;
        the negative pole of the first capacitor is electrically connected to a negative terminal of the AC supply;
        the base of the first transistor is connected to the negative pole of the second diode and the positive pole of the first capacitor;
        the second diode is connected between the base of the first transistor and the emitter of the first transistor;
        the second capacitor is connected between the emitter of the first transistor and a relay;
        the collector of the first transistor is connected to the negative pole of the first diode and the positive pole of the first capacitor;
        the base of the second transistor is connected with a processor-input drive signal to control the second transistor, such that when switched on by the drive signal, the second transistor charges a third capacitor with a voltage that will turn on the relay;
        the collector of the second transistor is connected to the negative pole of the second diode;
        the emitter of the second transistor is connected to the negative pole of the first capacitor;
        the positive pole of the third diode and the second capacitor are connected to the relay;
        the negative pole of the third diode is connected to the negative pole of the first capacitor and the emitter of the second transistor; and
        the relay is connected to the negative pole of the third diode, the emitter of the second transistor, and the negative pole of the first capacitor.

2. The relay drive circuit of claim 1, wherein:
    the relay circuit further includes:
        a fourth diode having a positive pole and a negative pole; and
        a third capacitor having a positive pole and a negative pole;

the positive pole of the third capacitor is connected to the negative pole of the third diode, the emitter of the second transistor, and the negative pole of the first capacitor;

the negative pole of the third capacitor and the positive pole of the fourth diode are connected to the relay; and the negative pole of the fourth diode is connected to the positive pole of the third diode and the second capacitor.

3. The relay drive circuit of claim 1, wherein the relay drive circuit further includes a first resistor connected in series with the first diode.

4. The relay drive circuit of claim 1, wherein:

the relay drive circuit further includes a second resistor, a third resistor, a fourth resistor, and a fifth resistor;

the second resistor is connected between the positive pole of the first capacitor and the base of the first transistor;

the third resistor is connected between the positive pole of the first capacitor and the collector of the first transistor;

the fourth resistor is connected between the negative pole of the second diode and the collector of the second transistor; and the fifth resistor is connected between the base of the second transistor and the drive signal.

5. The relay drive circuit of claim 1, wherein:

the relay circuit further includes:

a fourth diode having a positive pole and a negative pole;

the third capacitor having a positive pole and a negative pole;

a first resistor connected in series with the first diode;

a second resistor;

a third resistor;

a fourth resistor; and a fifth resistor;

the positive pole of the third capacitor is connected to the negative pole of the third diode, the emitter of the second transistor, and the negative pole of the first capacitor;

the negative pole of the third capacitor and the positive pole of the fourth diode are connected to the relay;

the negative pole of the fourth diode is connected to the positive pole of the third diode and the second capacitor;

the second resistor is connected between the positive pole of the first capacitor and the base of the first transistor;

the third resistor is connected between the positive pole of the first capacitor and the collector of the first transistor;

the fourth resistor is connected between the negative pole of the second diode and the collector of the second transistor; and the fifth resistor is connected between the base of the second transistor and the drive signal.

6. The relay drive circuit of claim 5, wherein:

the relay drive circuit includes a rectifying circuit operable for regulating a high AC input voltage into a high DC voltage, the rectifying circuit including the first diode, the first resistor, and the first capacitor;

the second transistor is controlled off by the drive signal when the drive signal is at a low level, whereby the first transistor is on, and the voltage on the first capacitor charges the second capacitor through the third resistor, the first transistor, the second capacitor, and the third diode; and the second transistor is on when the drive signal is at a high level, whereby the first transistor is off, and the voltage on the second capacitor charges the third capacitor through the second diode, the fourth resistor, the second transistor, the third capacitor, and the fourth diode; and the relay is connected in parallel with the third capacitor such that voltage across the third capacitor will turn on the relay.

7. The relay drive circuit of claim 1, wherein the relay drive circuit is operable to transform an AC voltage to a DC voltage and to use the DC voltage to control on/off of the relay.

8. The relay drive circuit of claim 1, wherein:

the relay drive circuit includes a rectifying circuit and a DC voltage converting circuit;

the rectifying circuit is electrically connected with an AC power supply to rectify high AC voltage into high DC voltage;

the DC voltage converting circuit is electrically connected between the rectifying circuit and the relay; and the DC voltage converting circuit is operable to transform high DC voltage into low DC voltage and to drive the relay.

9. The relay drive circuit of claim 8, wherein:

the rectifying circuit includes the first diode and the first capacitor; and the DC voltage converting circuit includes the second diode, the third diode, the first transistor, the second transistor, the second capacitor, and the drive signal.

10. The relay drive circuit of claim 9, wherein the on/off of the relay is controllable by the on/off of the second transistor, which is controllable by the drive signal.

11. The relay drive circuit of claim 8, wherein the relay drive circuit further includes a filter circuit electrically connected between the DC voltage converting circuit and the relay.

12. The relay drive circuit of claim 11, wherein:

the filter circuit comprises:

a fourth diode having a positive pole and a negative pole;

the third capacitor having a positive pole and a negative pole;

the positive pole of the third capacitor is electrically connected to the negative pole of the third diode, the emitter of the second transistor, and the negative pole of the first capacitor;

the negative pole of the third capacitor and the positive pole of the fourth diode are electrically connected to the relay;

the negative pole of the fourth diode is electrically connected to the positive pole of the third diode and the second capacitor; and a voltage across the third capacitor is an output voltage of the filter circuit.

* * * * *